US012649356B2

(12) United States Patent
Snider et al.

(10) Patent No.: US 12,649,356 B2
(45) Date of Patent: Jun. 9, 2026

(54) VEHICULAR REAR SLIDER WINDOW ASSEMBLY WITH ELECTRICAL CONNECTION TO MOVABLE PANEL HEATER GRID

(71) Applicant: Magna Mirrors of America, Inc., Holland, MI (US)

(72) Inventors: Darin J. Snider, Holland, MI (US); Kyle S. Bowman, Holland, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 929 days.

(21) Appl. No.: 17/931,998

(22) Filed: Sep. 14, 2022

(65) Prior Publication Data

US 2023/0084191 A1     Mar. 16, 2023

Related U.S. Application Data

(60) Provisional application No. 63/261,262, filed on Sep. 16, 2021.

(51) Int. Cl.
  H05B 3/84     (2006.01)
  B60J 1/18     (2006.01)
(52) U.S. Cl.
  CPC .............. B60J 1/1846 (2013.01); H05B 3/84 (2013.01)
(58) Field of Classification Search
  CPC ... B60J 1/1846; B60J 1/1853; E05D 15/0682; E05D 15/0691; E06B 3/4609; E06B 3/4618; H05B 2203/016; H05B 3/84
  USPC ........................................................ 219/203
  See application file for complete search history.

(56) References Cited

U.S. PATENT DOCUMENTS

| | | | | |
|---|---|---|---|---|
| 2,838,739 A | * | 6/1958 | Winkler ................. | H01R 13/26 |
| | | | | 439/295 |
| 4,920,698 A | | 5/1990 | Friese et al. | |
| 4,995,195 A | | 2/1991 | Olberding et al. | |
| 5,070,230 A | | 12/1991 | Osada et al. | |
| 5,146,712 A | | 9/1992 | Hlavaty | |
| 5,531,046 A | | 7/1996 | Kollar et al. | |
| 5,551,197 A | | 9/1996 | Repp et al. | |
| 5,572,376 A | | 11/1996 | Pace | |
| 5,676,562 A | * | 10/1997 | Fukuda ................... | H05B 3/84 |
| | | | | 439/329 |
| 5,830,529 A | | 11/1998 | Ross | |
| 5,853,895 A | | 12/1998 | Lewno | |

(Continued)

*Primary Examiner* — Sang Y Paik
(74) *Attorney, Agent, or Firm* — HONIGMAN LLP

(57)     ABSTRACT

A vehicular rear slider window assembly includes a fixed window panel and a movable window panel. Electrically conductive traces are at respective surfaces of the fixed window panel and the movable window panel. A fixed panel electrical connector is affixed at and connected to the electrically conductive traces at the fixed window panel, and a movable panel electrical connector is affixed at and connected to the electrically conductive traces at the movable window panel. A flexible electrical connector includes a movable panel connecting element to connect to the movable panel electrical connector and a fixed panel connecting element to connect to the fixed panel electrical connector. Terminals of the movable panel connecting element disposed at a cover portion connect with respective terminals of the movable panel electrical connector via movement of the cover portion parallel to the longitudinal axes of the terminals of the movable panel electrical connector.

26 Claims, 13 Drawing Sheets

(56)                References Cited

U.S. PATENT DOCUMENTS

| | | | |
|---|---|---|---|
| 6,068,719 | A | 5/2000 | Lewno |
| 6,119,401 | A | 9/2000 | Lin et al. |
| 6,319,344 | B1 | 11/2001 | Lewno |
| 6,691,464 | B2 | 2/2004 | Nestell et al. |
| 6,846,039 | B2 | 1/2005 | Lewno |
| 6,955,009 | B2 | 10/2005 | Rasmussen |
| 7,003,916 | B2 | 2/2006 | Nestell et al. |
| 7,073,293 | B2 | 7/2006 | Galer |
| 7,105,220 | B2 | 9/2006 | Freeman et al. |
| 7,184,190 | B2 | 2/2007 | McCabe et al. |
| 7,255,451 | B2 | 8/2007 | McCabe et al. |
| 7,274,501 | B2 | 9/2007 | McCabe et al. |
| 7,332,225 | B2 | 2/2008 | Lewno |
| 7,838,115 | B2 | 11/2010 | Lewno |
| 8,322,073 | B2 | 12/2012 | Lewno |
| 8,402,695 | B2 | 3/2013 | Smith et al. |
| 8,881,458 | B2 | 11/2014 | Snider et al. |
| 9,579,955 | B2 | 2/2017 | Snider |
| 9,624,707 | B2 | 4/2017 | Gipson et al. |
| 10,501,977 | B2 | 12/2019 | Snider et al. |
| 10,797,374 | B1 | 10/2020 | Tengler et al. |
| 10,843,644 | B2 | 11/2020 | Snider et al. |
| 2003/0213179 | A1 | 11/2003 | Galer |
| 2004/0020131 | A1 | 2/2004 | Galer et al. |
| 2004/0124659 | A1 | 7/2004 | Vaitus et al. |
| 2004/0245801 | A1 | 12/2004 | Gates et al. |
| 2005/0194805 | A1 | 9/2005 | Gates et al. |
| 2006/0107600 | A1 | 5/2006 | Nestell et al. |
| 2007/0029301 | A1 | 2/2007 | Tokiwa et al. |
| 2007/0046060 | A1 | 3/2007 | Werner |
| 2008/0127563 | A1 | 6/2008 | Tooker |
| 2010/0146859 | A1 | 6/2010 | Gipson et al. |
| 2010/0193242 | A1 | 8/2010 | Derda et al. |
| 2011/0030276 | A1* | 2/2011 | Smith ................... H01R 35/02 |
| | | | 49/70 |
| 2011/0056140 | A1 | 3/2011 | Lewno |
| 2011/0233182 | A1 | 9/2011 | Baranski |
| 2011/0297661 | A1 | 12/2011 | Raghavan et al. |
| 2012/0091114 | A1 | 4/2012 | Ackerman et al. |
| 2012/0117880 | A1 | 5/2012 | Lahnala et al. |
| 2012/0291353 | A1 | 11/2012 | Gipson et al. |
| 2013/0174488 | A1 | 7/2013 | Snider et al. |
| 2015/0244089 | A1 | 8/2015 | Reul et al. |
| 2015/0314757 | A1 | 11/2015 | Bennett et al. |
| 2016/0001744 | A1 | 1/2016 | Sitterlet |
| 2016/0200241 | A1 | 7/2016 | Snider |
| 2016/0347036 | A1 | 12/2016 | Mellor et al. |
| 2017/0019955 | A1 | 1/2017 | Schulz et al. |
| 2017/0118803 | A1 | 4/2017 | Dimitrijevic et al. |
| 2017/0231034 | A1 | 8/2017 | Maclachlan |
| 2017/0238371 | A1 | 8/2017 | Lahnala et al. |
| 2017/0246984 | A1 | 8/2017 | Snider |
| 2018/0227986 | A1 | 8/2018 | Snider et al. |
| 2018/0310366 | A1 | 10/2018 | Nelson et al. |
| 2019/0357316 | A1 | 11/2019 | Douma |
| 2019/0383084 | A1 | 12/2019 | Snider et al. |
| 2021/0070241 | A1 | 3/2021 | Snider et al. |
| 2022/0295603 | A1 | 9/2022 | Snider et al. |
| 2023/0084191 | A1 | 3/2023 | Snider et al. |

* cited by examiner

Openings for Fixed Glass Soldered Tabs to F/A load and slide C/C to install

136

132

128

136b

132b

Openings for Fixed Glass
Soldered Tabs to F/A load
and slide C/C to install

232b

236

232b

236b

228

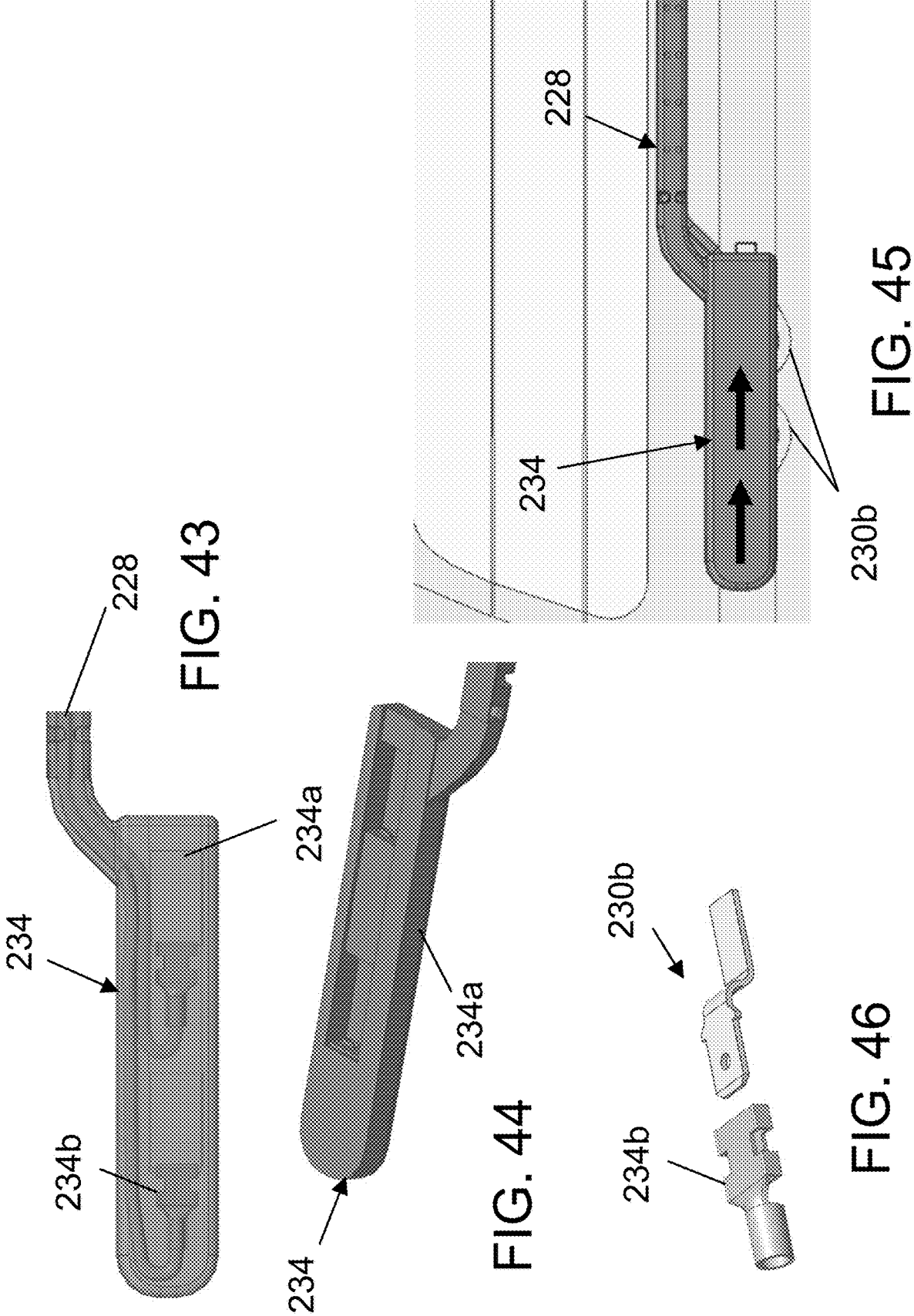

VEHICULAR REAR SLIDER WINDOW ASSEMBLY WITH ELECTRICAL CONNECTION TO MOVABLE PANEL HEATER GRID

CROSS REFERENCE TO RELATED APPLICATION

The present application claims the filing benefits of U.S. provisional application Ser. No. 63/261,262, filed Sep. 16, 2021, which is hereby incorporated herein by reference in its entirety.

FIELD OF THE INVENTION

The present invention relates generally to movable or slider window assemblies for vehicles and, more particularly to a side or rear slider window assembly for a vehicle having a heating element or feature.

BACKGROUND OF THE INVENTION

It is known to provide a slider window assembly for an opening of a vehicle, such as a rear slider window assembly for a rear opening of a pickup truck. Conventional slider window assemblies for rear openings of trucks or the like typically include three or more panels, such as two fixed window panels and a slidable window panel. The slidable window panel is supported by rails and may be moved along the rails to open and close the window. It is also known to provide a heating element at the window assembly to defog or defrost the window panels. The window panels typically include respective heater grids that are electrically connected to a power source and are heated responsive to actuation of a user input. The individual electrical connectors are soldered at the heater grids or busbars at the window panel.

SUMMARY OF THE INVENTION

A vehicular rear slider window assembly provides for defogging or defrosting of the window panel or panels of the rear slider window assembly via electrically conductive traces or heater grids at one or more window panels of the rear slider window assembly. The heater grids are disposed at a surface of the fixed and movable window panels and comprise electrically conductive traces or busbars at which electrical connectors are disposed for electrically connecting the busbars and heater grids to a wire harness of the vehicle. The electrical connectors are soldered at (or otherwise retained at) the respective busbars. A movable panel electrical connector is affixed at and electrically connected to the electrically conductive traces at the surface of the movable window panel. The movable panel electrical connector comprises first and second terminals electrically connected at respective portions of the electrically conductive traces such that the connecting directions or longitudinal axes of the first and second terminals are parallel to one another. A flexible electrical connector electrically connects the fixed panel electrical connector to the movable panel electrical connector. The flexible electrical connector comprises a movable panel connecting element configured to electrically connect to the movable panel electrical connector at the movable window panel. The movable panel connecting element of the flexible connector comprises first and second terminals disposed at a cover portion with the longitudinal axes of the first and second terminals being parallel to one another. The first and second terminals of the movable panel connecting element electrically connect together and in tandem with the respective first and second terminals electrically connected at respective portions of the electrically conductive traces of the movable window panel via movement of the cover portion in a direction parallel to the longitudinal axes of the first and second terminals.

These and other objects, advantages, purposes and features of the present invention will become apparent upon review of the following specification in conjunction with the drawings.

BRIEF DESCRIPTION OF THE DRAWINGS

FIGS. 43 and 44 are views of the fixed panel connecting element of the flexible connector of FIG. 29;

FIG. 45 is a schematic showing connection of the fixed panel connecting element to the fixed panel connector as the fixed panel connecting element moves horizontally relative to the fixed panel connector and parallel to the longitudinal axes of the terminals of the fixed panel connector; and FIG. 46 shows the connection of the terminals as the fixed panel connecting element slides onto the fixed panel connector.

DESCRIPTION OF THE PREFERRED EMBODIMENTS

Figure 1:
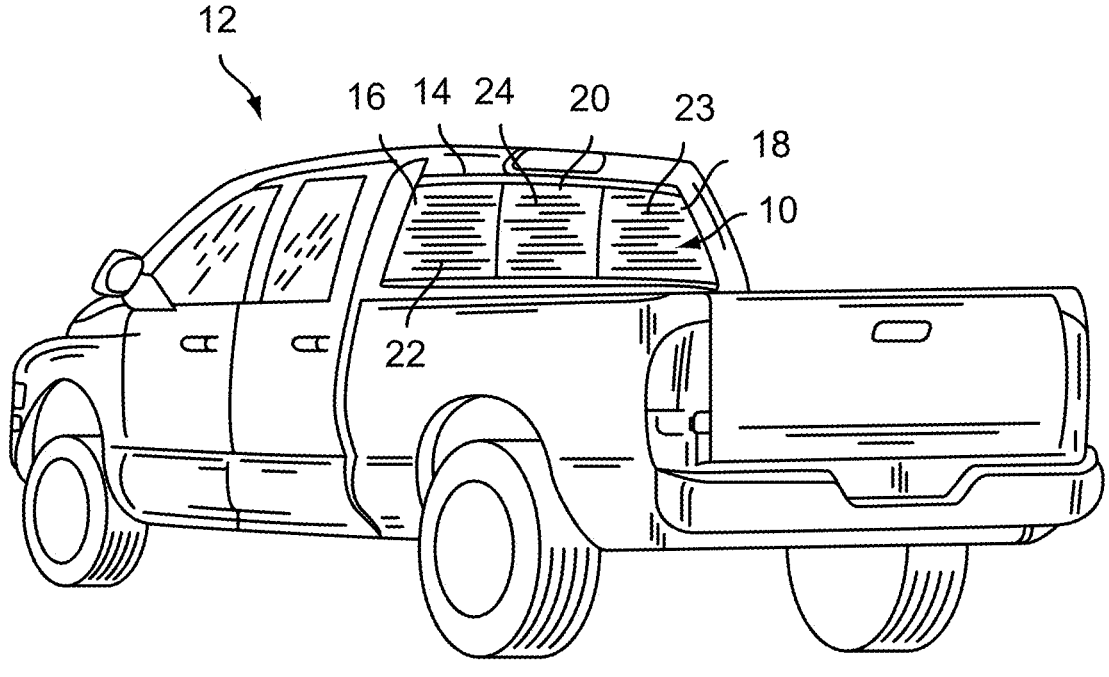
FIG. 1 is a rear perspective view of a pickup truck having a rear slider window assembly.

Referring now to the drawings and the illustrative embodiments depicted therein, a rear slider window assembly 10 of a vehicle 12 (such as a pickup truck or the like) includes a window frame 14 (having upper and lower rails), a pair of side fixed window panels 16, 18 and a movable window panel 20 that is movable relative to the frame 14 and the fixed window panels 16, 18 between an opened position and a closed position. The fixed window panels 16, 18 may be spaced from one another to define an opening between the fixed window panels 16, 18. Optionally, the window assembly includes a single fixed window panel having an opening between opposing sides of the fixed window panel. In the closed position, the movable window panel is disposed at the opening between the fixed window panel, and in the opened position, the movable window panel is disposed at least partially along one of the fixed window panels (or one side of the singular fixed window panel).

The fixed window panels 16, 18 each include an electrically conductive heater grid 22, 23 or other heating element or electrically operable element established at the window panels 16, 18 (such as at or on an interior surface of the window panels), and the movable window panel 20 includes an electrically conductive heater grid or other heating element or electrically operable element 24 established at the window panel 20 (such as at or on an interior surface of the movable window panel).

The heater grids 22, 23 at the fixed window panels 16, 18 are electrically conductively connected to (or are otherwise in electrical conductive continuity with) a power source of the vehicle and may be powered (such as responsive to a user actuatable input or switch or button of the vehicle or responsive to a sensor or accessory of the vehicle) to heat or defrost or defog the fixed window panels 16, 18. The movable panel heater grid 24 is electrically connected to the power source (and may be electrically connected to electrical terminals or elements at one of the heater grids 22, 23 of the fixed window panels) and may be electrically powered to heat or defrost or defog the movable window panel 20. The movable panel heater grid 24 is electrically connected to electrically conductive traces at the fixed window panel via a flexible electrical connector.

Figure 2:
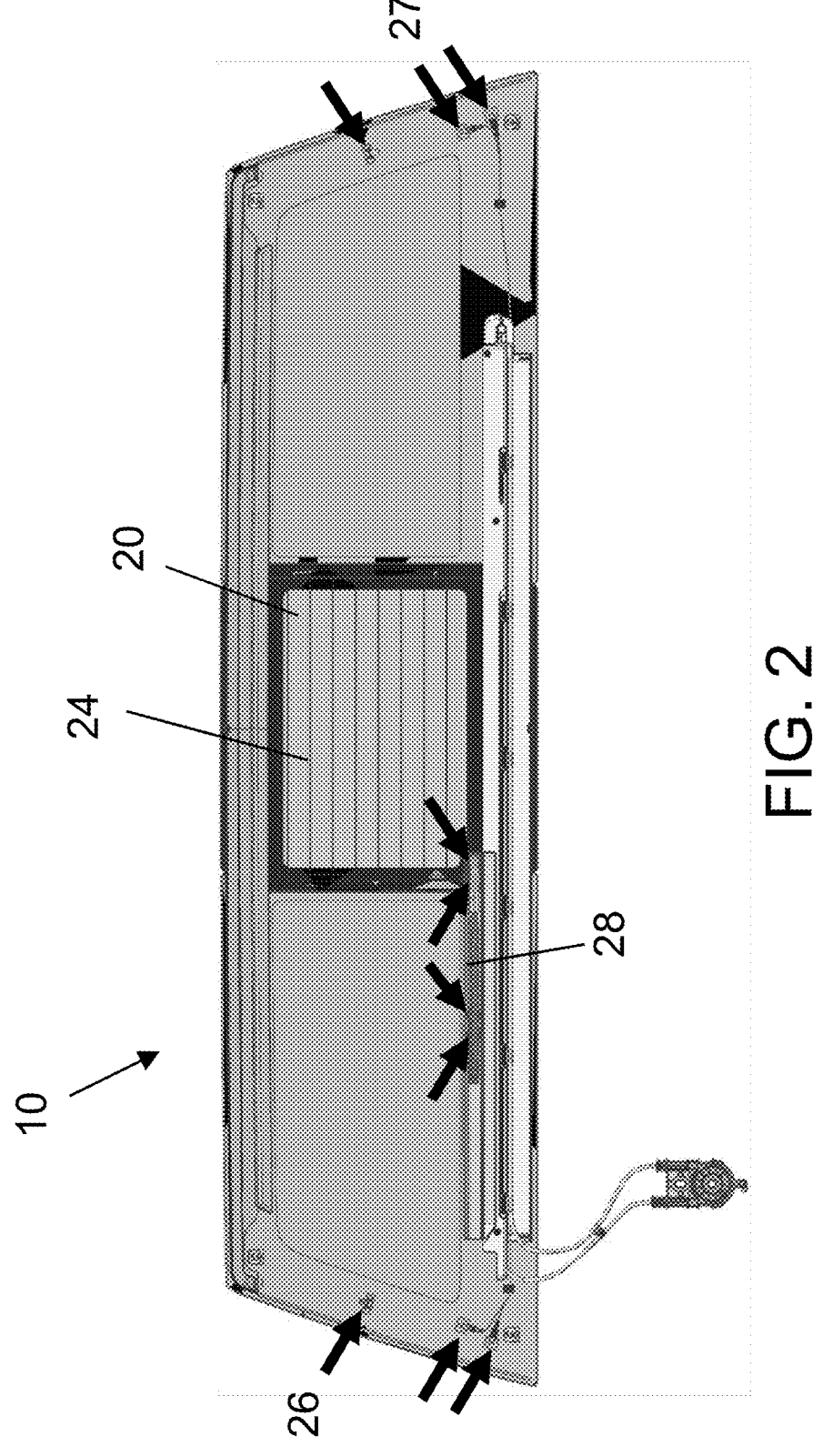
FIG. 2 is a plan view of a rear slider window assembly with a plurality of individual terminals soldered at the window panels.
Figures 3, 4:
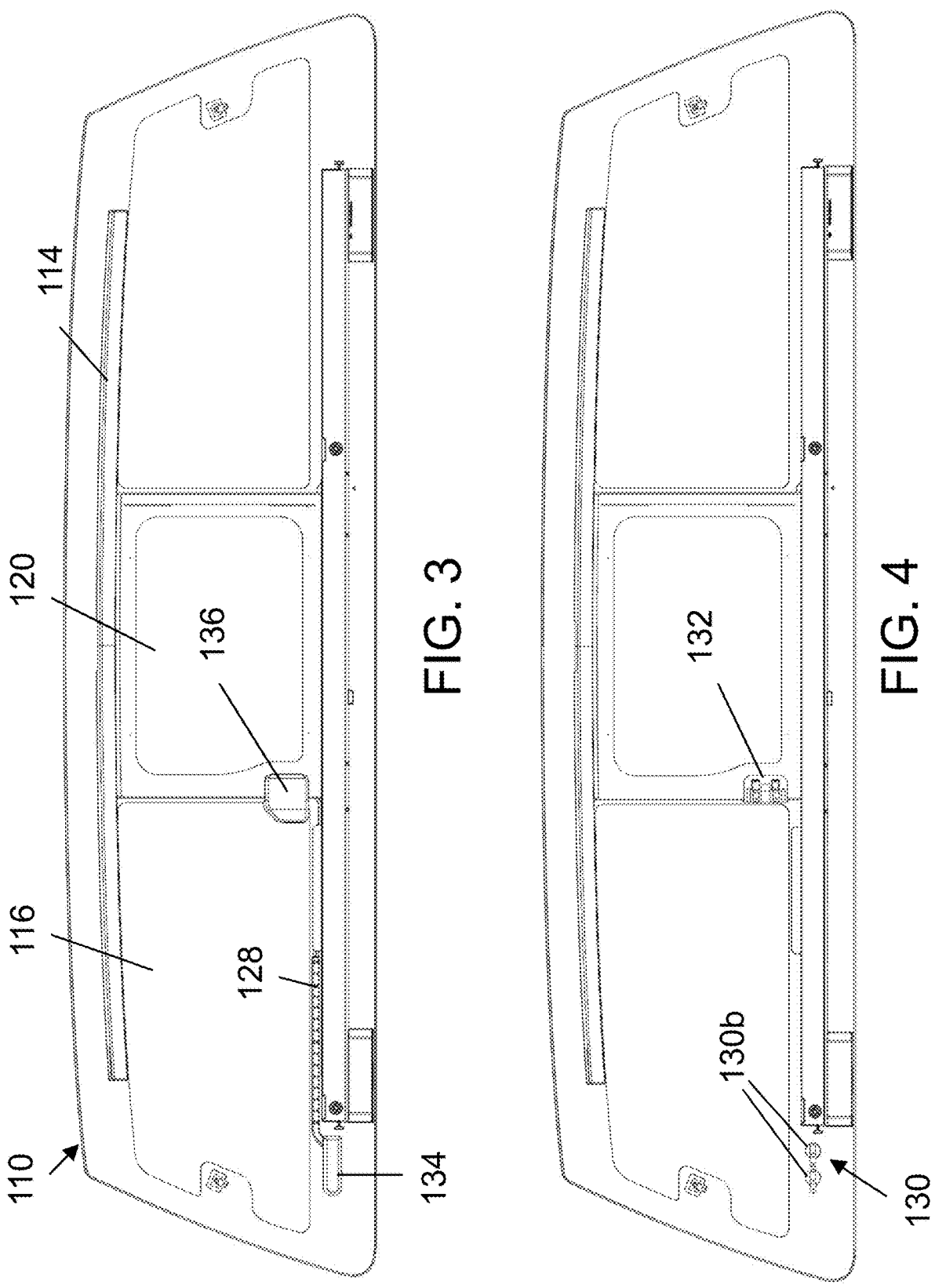
FIG. 3 is a plan view of a rear slider window assembly with a flexible connector having connecting elements at its ends for slidably connecting to a fixed panel connector at the fixed window panel and a movable panel connector at the movable window panel.
FIG. 4 is another plan view of the rear slider window assembly of FIG. 3, with the flexible connector and connecting elements removed.
Figures 5, 6, 7, 8:
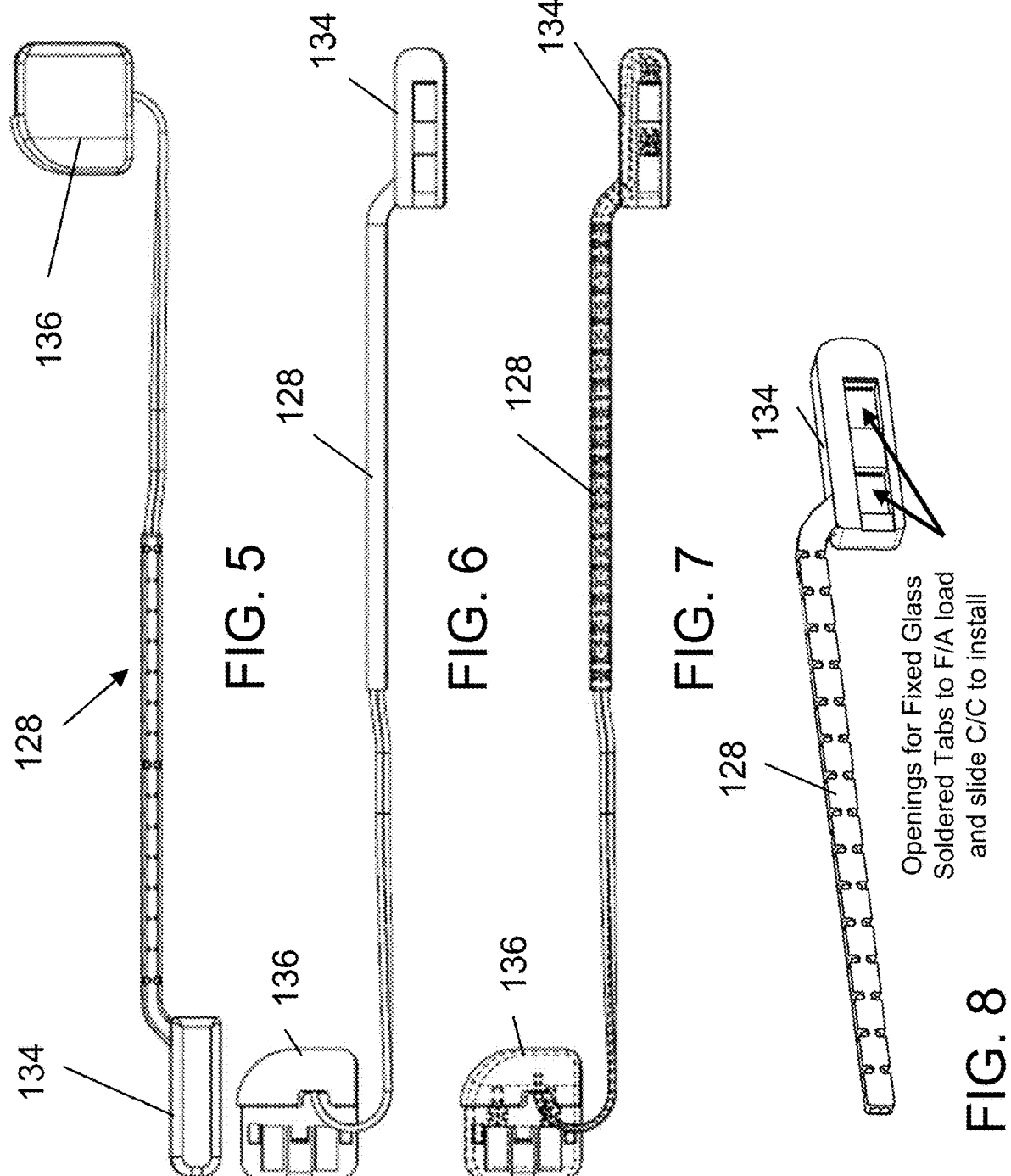
FIGS. 5-7 are views of the flexible connector of FIG. 3.
FIG. 8 is an enlarged perspective view of the fixed panel connecting end of the flexible connector.
Figures 9, 10, 11, 12, 13, 14, 15:
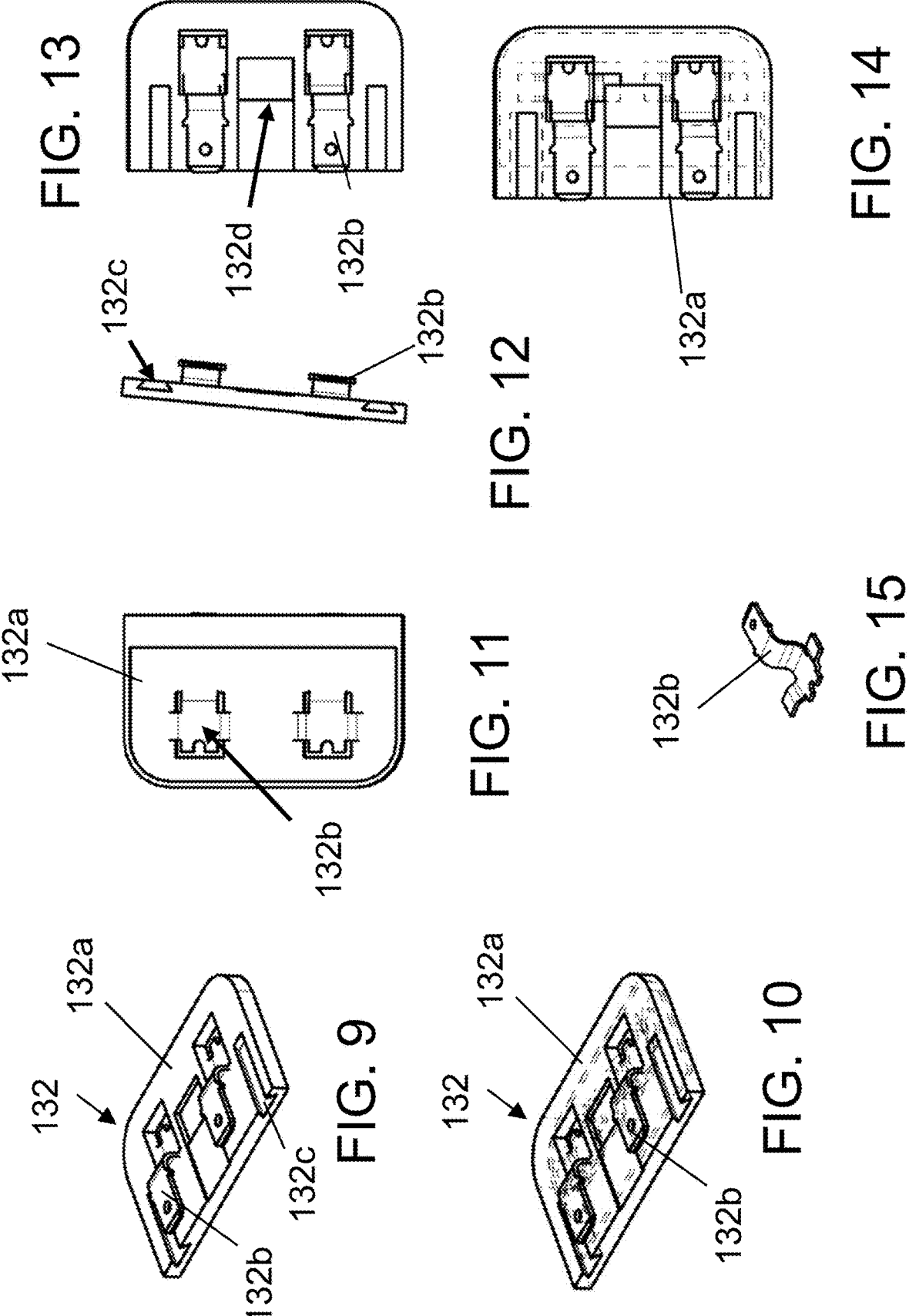
FIGS. 9 and 10 are perspective views of the movable panel connector of FIG. 4.
FIG. 11 is a bottom view of the movable panel connector.
FIG. 12 is a front view of the movable panel connector.
FIGS. 13 and 14 are top views of the movable panel connector.
FIG. 15 is a perspective view of one of the terminals of the movable panel connector.
Figures 16, 17, 18, 19, 20, 21, 22:
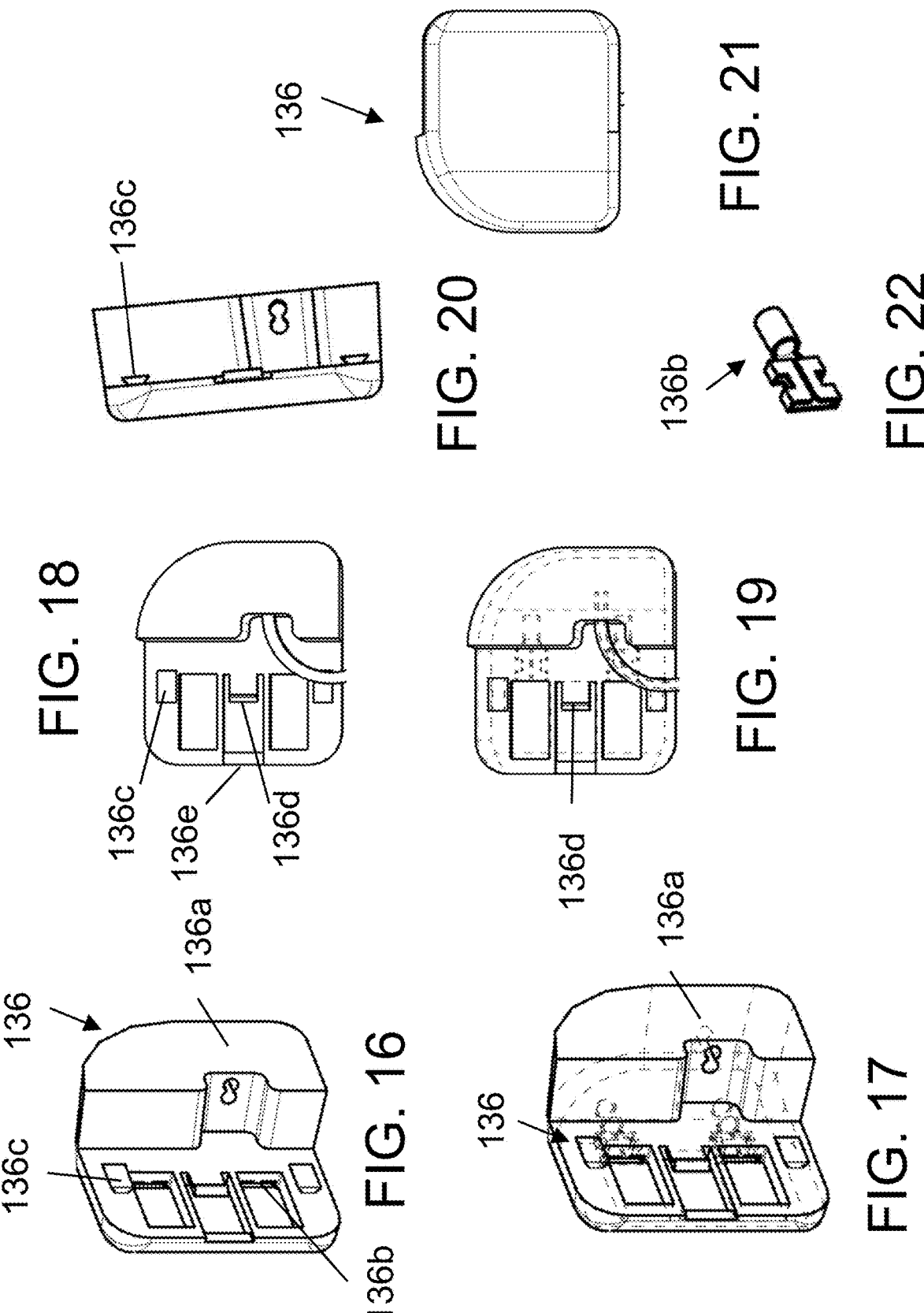
FIGS. 16 and 17 are perspective views of the movable panel connecting element of the flexible connector of FIG. 3.
FIGS. 18 and 19 are top views of the movable panel connecting element of the flexible connector.
FIG. 20 is a front view of the movable panel connecting element of the flexible connector.
FIG. 21 is a top view of the movable panel connecting element of the flexible connector.
FIG. 22 is a perspective view of one of the terminals of the movable panel connecting element of the flexible connector.

The heater grids of the movable panel and the fixed panels include electrically conductive traces and busbars, which are electrically connected to the vehicle wire harness via respective electrical connectors 26, 27 (FIG. 2) bonded at the fixed window panel. As shown in FIG. 2, the electrical connection of a flexible electrical connector 28 (to electrically connect electrically conductive traces of the movable window panel 20 to the electrically conductive traces of the fixed window panel) comprises electrical connection of individual connecting elements (a positive connecting element and a negative connecting element) at each end of the flexible connector 28 to individual connectors or terminals (a positive terminal and a negative terminal) at the respective fixed or movable window panel. That is, individual positive and negative connecting elements at a first end of the flexible connector 28 electrically connect to respective individual positive and negative connecting elements of the fixed window panel, and individual positive and negative connecting elements at a second, opposite end of the flexible connector 28 electrically connect to respective individual positive and negative connecting elements of the movable window panel 20. The terminals typically are snap or button type terminals and/or blade terminals soldered at the electrically conductive traces of the window panels. For example, the window assembly may have two solder blades 26 at the opposite sides of the fixed window for connecting to the vehicle wires and 4-8 solder buttons 27 (or solder blades) for jumper wires and connecting wires (that electrically connect to the heater grid at the movable window panel).

In the illustrated embodiment of FIGS. 3-28, a rear slider window assembly 110 includes a window frame 114 (having upper and lower rails), a fixed window panel or panels 116 and a movable window panel 120 that is movable relative to the frame 14 and the fixed window panel 116 between an opened position and a closed position. The fixed window panel 116 includes an electrically conductive heater grid or other heating element or electrically operable element and the movable window panel 120 includes an electrically conductive heater grid or other heating element or electrically operable element established at the window panel. The fixed window panel may have screened on jumper wires (comprising electrically conductive traces or busbars extending across the center region of the fixed panel above and/or below the opening) to electrically connect the heater grids at opposite sides of the fixed window panel. A flexible electrical connector 128 electrically connects a fixed panel connector 130 at the fixed window panel 116 to a movable panel connector 132 at the movable window panel 120.

As shown in FIGS. 5-8, the flexible connector 128 comprises a flexible wire or cable with a fixed panel connecting element 134 at one end of the wire or cable and a movable panel connecting element 136 at the other end of the wire or cable. The connecting elements 134, 136 are each configured to electrically connect to the respective connectors 130, 132 via a single connecting movement of the respective connecting element, as discussed below.

As shown in FIGS. 4 and 9-15, the movable panel connector 132 comprises a plastic base portion 132a that houses or attaches at terminals 132b (a positive terminal and a negative terminal). The base portion 132a is configured to have the terminals attached thereat (or to be molded over the terminals), with a trace-connecting portion of each terminal 132b at a bottom part of the base portion 132a and with a spade type connecting portion of each terminal 132b protruding from an upper side of the base portion 132a. The trace-connecting portions or solder flux pads may be soldered to the respective electrically conductive trace or busbar at the movable window panel 120 when the base portion 132a is disposed at the movable window panel 120. Optionally, the bottom of the base portion 132a may be adhesively attached at the movable window panel 120 to further secure the terminals 132b at the electrically conductive traces at the movable window panel 120. In the illustrated embodiment, the terminals 132b comprise wing elements to facilitate snap-attaching and retaining the terminals 132b at the base portion 132a. When the movable panel connecting element 132 is affixed at the movable window panel 120, the terminals 132b are arranged at (and fixedly electrically conductively attached at) the movable window panel 120 so that the longitudinal axes and connecting direction of the terminals 132b are parallel to one another for electrical connection with the movable panel connecting element 136 of the flexible connector 128. Optionally, the longitudinal axes of the respective terminals 132b may be axially aligned or coaxial with one another.

As shown in FIGS. 16-22, the movable panel connecting element 136 comprises a plastic cover portion 136a that houses terminals 136b (a positive terminal and a negative terminal). The terminals 136b are received in respective slots of the cover portion 136a and the wires of the flexible connector 128 are routed through the cover portion 136a to the terminals 136b (or the cover portion 136a may be molded partially over and around the terminals 136b). The terminals 136b are configured to, together and in tandem, electrically connect to the terminals 132b of the movable panel connector 132 via a single connecting movement of the movable panel connecting element 136 along the movable panel connector 132. Thus, the terminals 136b of the movable panel connecting element 136 are positioned at the cover portion 136a to have respective longitudinal axes that are parallel to one another (and optionally axially aligned or coaxial with one another) to correspond to the respective terminals 132b of the movable panel connector 132.

The base portion 132a of the movable panel connector 132 and the cover portion 136a of the movable panel connecting element 136 may be configured with an alignment feature that functions to align the terminals 136b with the terminals 132b as the movable panel connecting element 136 is attached at the movable panel connector 132. In the illustrated embodiment, the base portion 132a includes a pair of dovetail recesses 132c (FIGS. 9 and 12) and the cover portion 136a includes a pair of dovetail protrusions 136c (FIGS. 16-18 and 20) that are received in the recesses 132c to align the terminals 132b, 136b as the movable panel connecting element 136 is attached at the movable panel connector 132. That is, as the movable panel connecting element 136 is moved into engagement with the movable panel connector 132, the dovetail protrusions 136c slide or move along the dovetail recesses 132c and the terminals 136b electrically connect to the terminals 132b.

The base portion 132a and the cover portion 136a may also be configured with a snap together feature that functions to snap and retain the cover portion 136a at the base portion 132a when the terminals 136b connect to the terminals 132b as the movable panel connecting element 136 is attached at the movable panel connector 132. In the illustrated embodiment, the base portion 132a includes snap feature 132d (FIG. 13) and the cover portion 136a includes a snap feature or flexible tab 136d (FIGS. 18 and 20) that snaps to the snap feature or lip 132d when the movable panel connecting element 136 is attached at the movable panel connector 132. That is, once the movable panel connecting element 136 is fully engaged with the movable panel connector 132 and the terminals 136b are electrically connected to the terminals 132b, the flexible tab 136d of the movable panel connecting element 136 snaps into engagement with the recess or snap feature 132d of the movable panel connector 132 to secure the movable panel connecting element 136 and movable panel connector 132 together. The cover portion 136a may include a narrow opening 136e (FIG. 18) at the snap feature 136d to facilitate disengagement of the movable panel connecting element 136 from the movable panel connector 132. For example, the opening 136e may allow a tool to be positioned between the cover portion 136a and the base portion 132a at or near the snap features 132d, 136d to pry or leverage or un-snap the movable panel connecting element 136 and the movable panel connector 132 apart. The base portion 132a may comprise a softer material, while the cover portion 136a may comprise a harder material for aesthetics.

Figure 23:
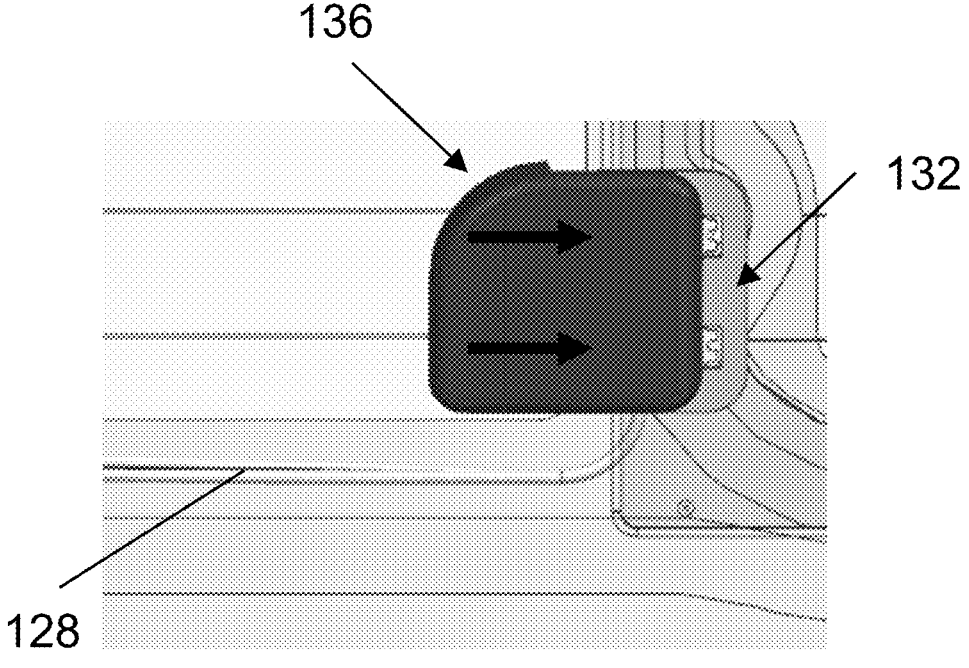
FIG. 23 is a schematic showing connection of the movable panel connecting element to the movable panel connector as the movable panel connecting element moves horizontally relative to the movable panel connector and parallel to the longitudinal axes of the terminals of the movable panel connector.
Figure 24:
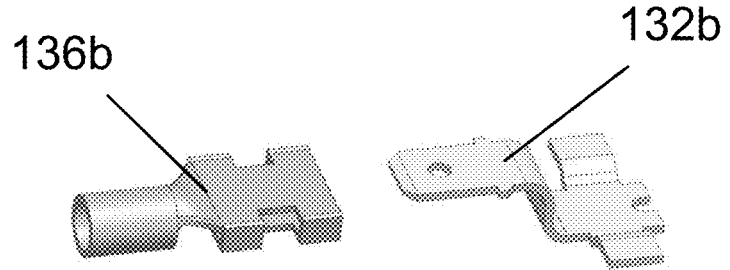
FIG. 24 shows the connection of the terminals as the movable panel connecting element slides onto the movable panel connector.

Thus, and as shown in FIGS. 23 and 24, the movable panel connecting element 136 is attached at the movable panel connector 132 by sliding the movable panel connecting element 136 relative to the movable panel connector 132 in a horizontal direction (in the illustrated embodiment, the longitudinal axes of the terminals are generally horizontal, but could be vertical or other direction or orientation, as discussed below). The sliding movement is controlled and aligned via the alignment features (e.g., the dovetail protrusions 136c and the dovetail recesses 132c), such that sliding of the movable panel connecting element 136 along the movable panel connector 132 electrically connects the terminals 136b to the terminals 132b. The sliding movement continues until the cover portion 136a is seated at and snap-attached at the base portion 132a. As shown in FIG. 24, the terminal 132b electrically connects to the terminal 136b when a tab of the terminal 132b is inserted into a receiving portion of the terminal 136b as the sliding movement attaches the movable panel connecting element 136 to the movable panel connector 132.

Similarly, the fixed panel connector 130 comprises individual terminals 130b (a positive terminal and a negative terminal) arranged at (and fixedly electrically conductively attached at) the fixed window panel 116 (and electrically conductively connected to respective electrically conductive traces or busbars at the fixed window panel 116) so that the longitudinal axes and connecting direction of the terminals 130b are parallel. For example, and such as shown in FIG.

Figures 25, 26, 27, 28:
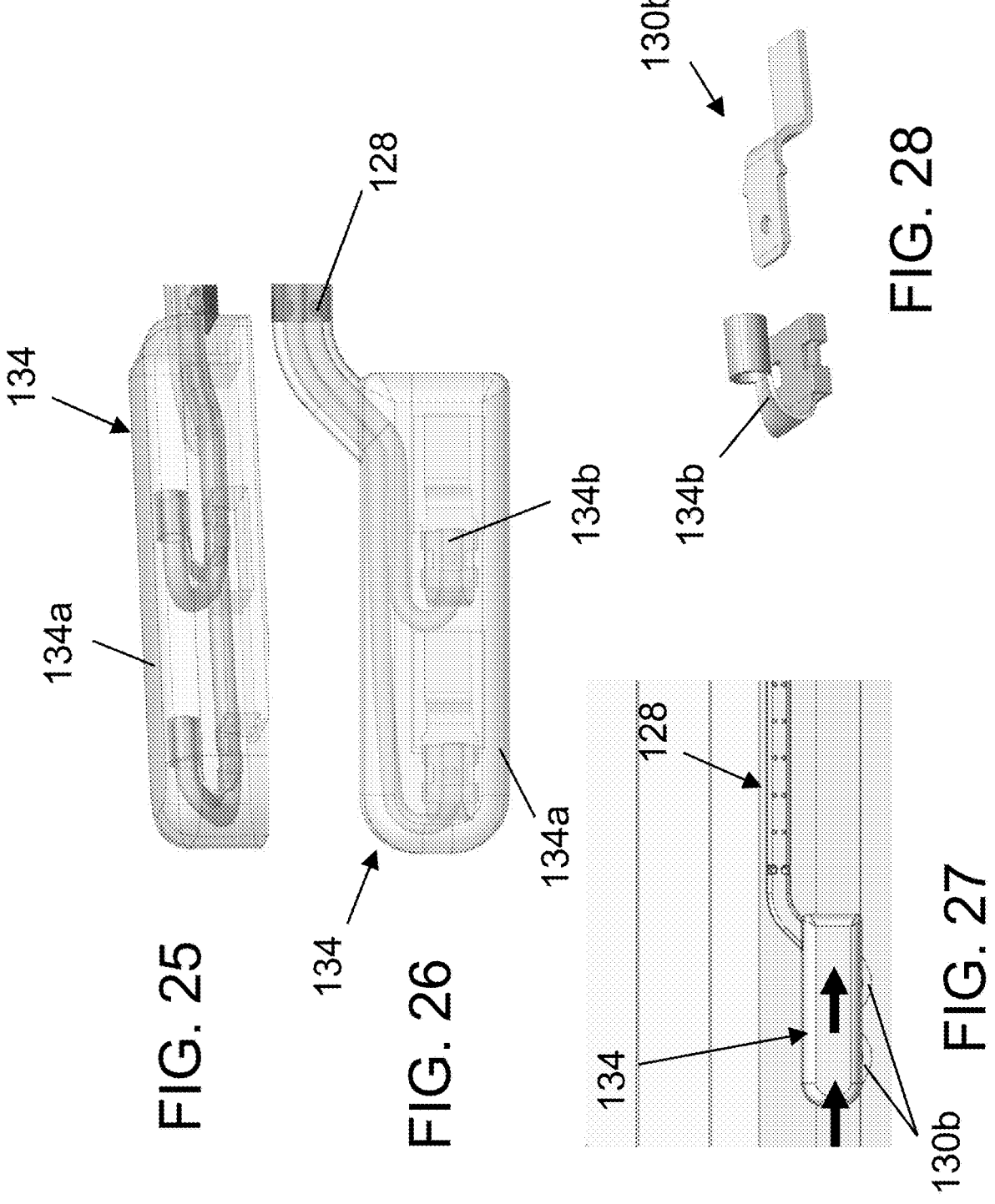
FIGS. 25 and 26 are views of the fixed panel connecting element of the flexible connector of FIG. 3.
FIG. 27 is a schematic showing connection of the fixed panel connecting element to the fixed panel connector as the fixed panel connecting element moves horizontally relative to the fixed panel connector and parallel to the longitudinal axes of the terminals of the fixed panel connector.
FIG. 28 shows the connection of the terminals as the fixed panel connecting element slides onto the fixed panel connector.

4, the terminals 130*b* of the fixed panel connector 130 are parallel to one another with the longitudinal axes of the terminals 130*b* aligned or coaxial with one another. As shown in FIGS. 25 and 26, the fixed panel connecting element 134 comprises a plastic cover portion 134*a* that houses terminals 134*b*. The terminals 134*b* are received in or disposed in slots of the cover portion 134*a* and the wires of the flexible connector 128 are routed through the cover portion 134*a* to the terminals 134*b*. The terminals 134*b* are configured to, together and in tandem, electrically connect to the terminals 130*b* (FIGS. 27 and 28) of the fixed panel connector 130 via a single connecting movement of the fixed panel connecting element 134 along the fixed panel connector 130. Thus, the terminals 134*b* of the fixed panel connecting element 134 are positioned at the cover portion 134*a* to have respective longitudinal axes that are parallel to one another and axially aligned or coaxial with one another to correspond to the respective terminals 130*b* of the fixed panel connector 130. In the illustrated embodiment, the longitudinal axes of the terminals 130*b* are generally horizontally oriented relative to the fixed window panel (FIG. 4), but could be vertically oriented or could be arranged in another direction or orientation (while being parallel to one another).

Thus, and as shown in FIGS. 27 and 28, the fixed panel connecting element 134 is attached at the fixed panel connector 130 by sliding the fixed panel connecting element 134 relative to the fixed panel connector 130 in a horizontal direction (in the illustrated embodiment, the longitudinal axes of the terminals 130*b* are generally horizontal, but could be vertical or other direction or orientation). The sliding movement may be controlled and aligned via alignment features, such that sliding of the fixed panel connecting element 134 along the fixed panel connector 130 electrically connects the terminals 134*b* to the terminals 130*b* of the fixed panel connector. As shown in FIG. 28, the terminal 130*b* electrically connects to the terminal 134*b* when a tab of the terminal 130*b* is inserted into a receiving portion of the terminal 134*b* as the sliding movement attaches the fixed panel connecting element 134 to the fixed panel connector 130. The fixed panel connecting element 134 may have a snap or retaining feature to retain the fixed panel connecting element 134 at the fixed panel connector 130, or tape or other retaining means may be implemented to retain the fixed panel connecting element 134 at the fixed panel connector 130.

Figures 41, 42:
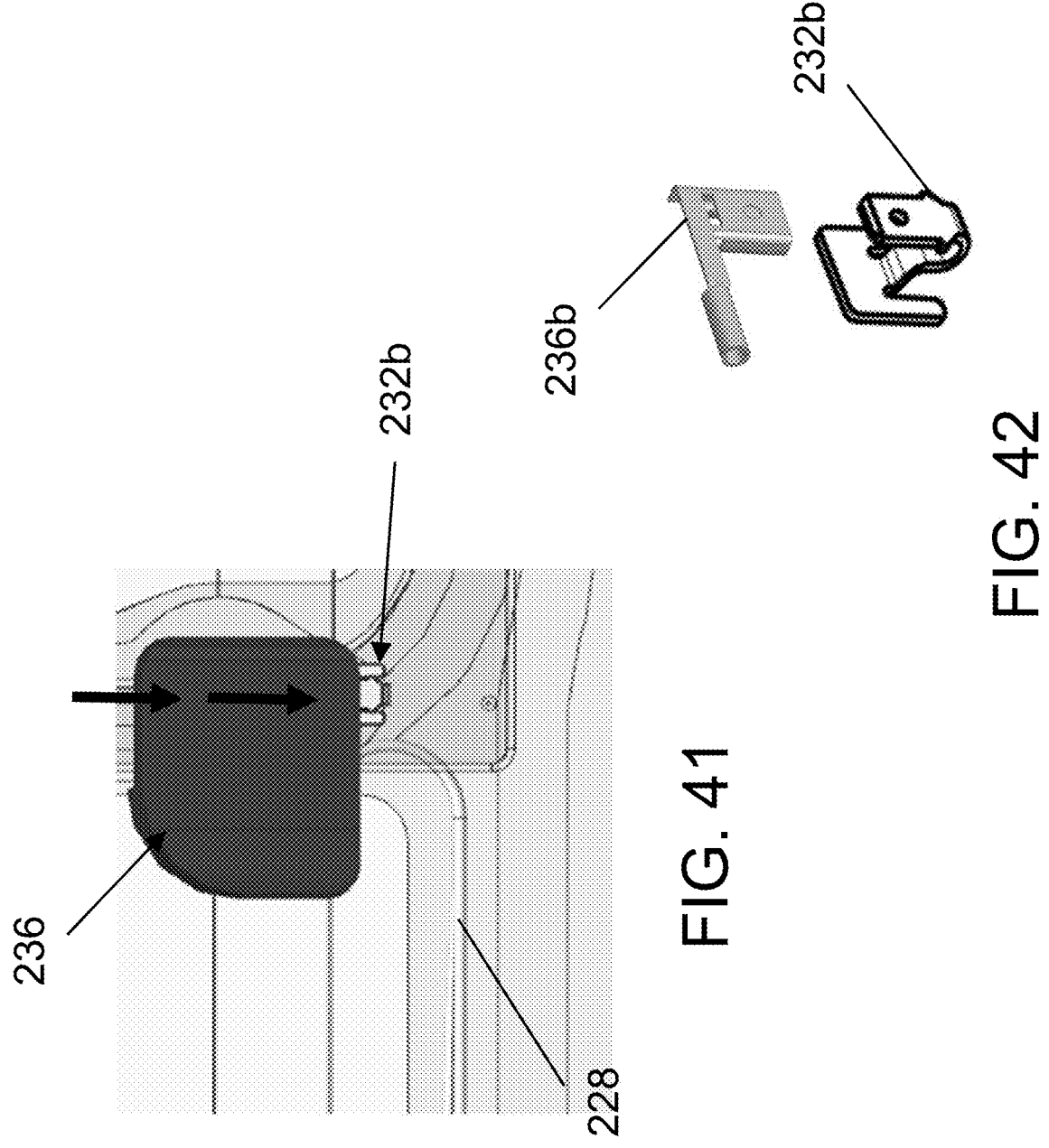
FIG. 41 is a schematic showing connection of the movable panel connecting element to the movable panel connector as the movable panel connecting element moves vertically relative to the movable panel connector and parallel to the longitudinal axes of the terminals of the movable panel connector.
FIG. 42 shows the connection of the terminals as the movable panel connecting element slides onto the movable panel connector.

Although shown and described as having the connection between the movable panel connecting element 136 and the movable panel connector 132 being made via horizontal movement of the movable panel connecting element 136 along the movable panel connector 132, it is envisioned that other connecting movements may be implemented. For example, and with reference to FIGS. 29-46, a window assembly 210 has the movable panel connecting element 236 vertically movable (such as downward) along the movable panel connector 232, which has the terminals 232*b* (FIGS. 41 and 42) arranged at the movable panel 220 with their longitudinal axes vertically oriented.

As shown in FIGS. 31-34, the flexible connector 228 comprises a flexible wire or cable with the fixed panel connecting element 234 at one end of the wire or cable and a movable panel connecting element 236 at the other end of the wire or cable. The connecting elements 234, 236 are each configured to electrically connect to the respective connectors 230, 232 (electrically connected to respective busbars or traces of the fixed window panel 216 or the movable window panel 220) via a single connecting movement of the respective connecting element 234, 236.

Figures 29, 30:
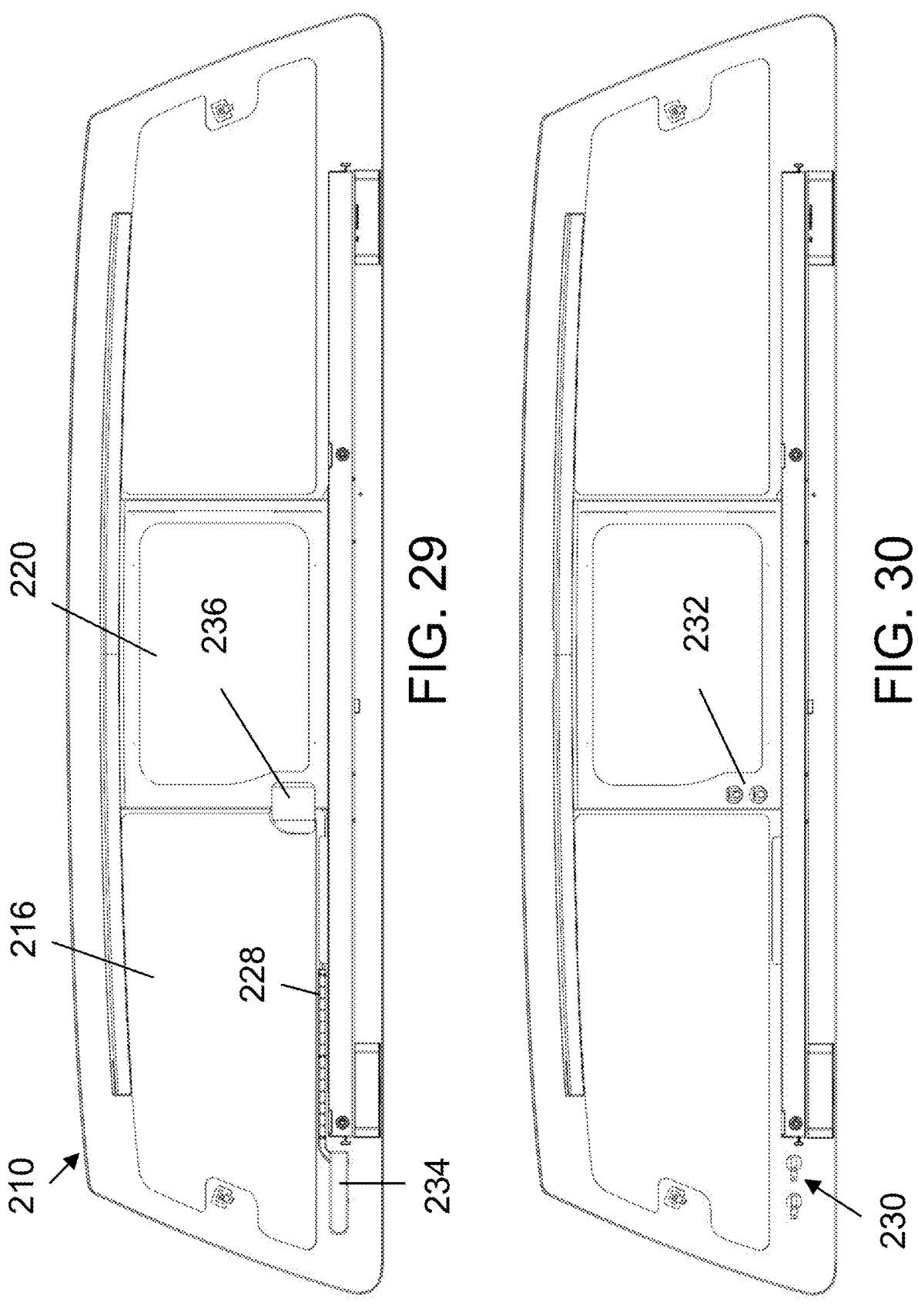
FIG. 29 is a plan view of another rear slider window assembly with a flexible connector having connecting elements at its ends for slidably connecting to a fixed panel connector at the fixed window panel and a movable panel connector at the movable window panel.
FIG. 30 is another plan view of the rear slider window assembly of FIG. 29, with the flexible connector and connecting elements removed.
Figures 31, 32, 33, 34:
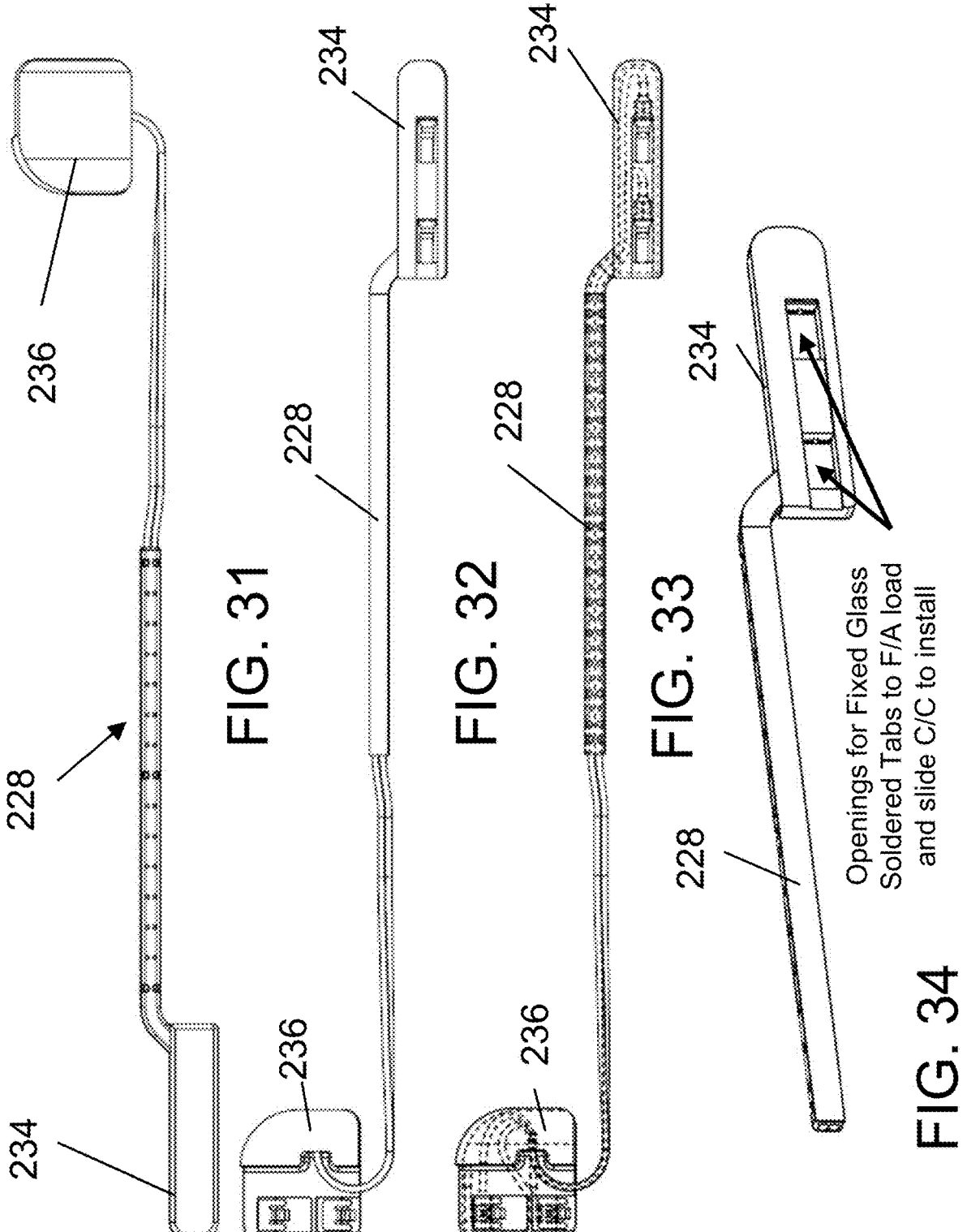
FIGS. 31-33 are views of the flexible connector of FIG. 29.
FIG. 34 is an enlarged perspective view of the fixed panel connecting end of the flexible connector.
Figures 35, 36, 37, 38, 39, 40:
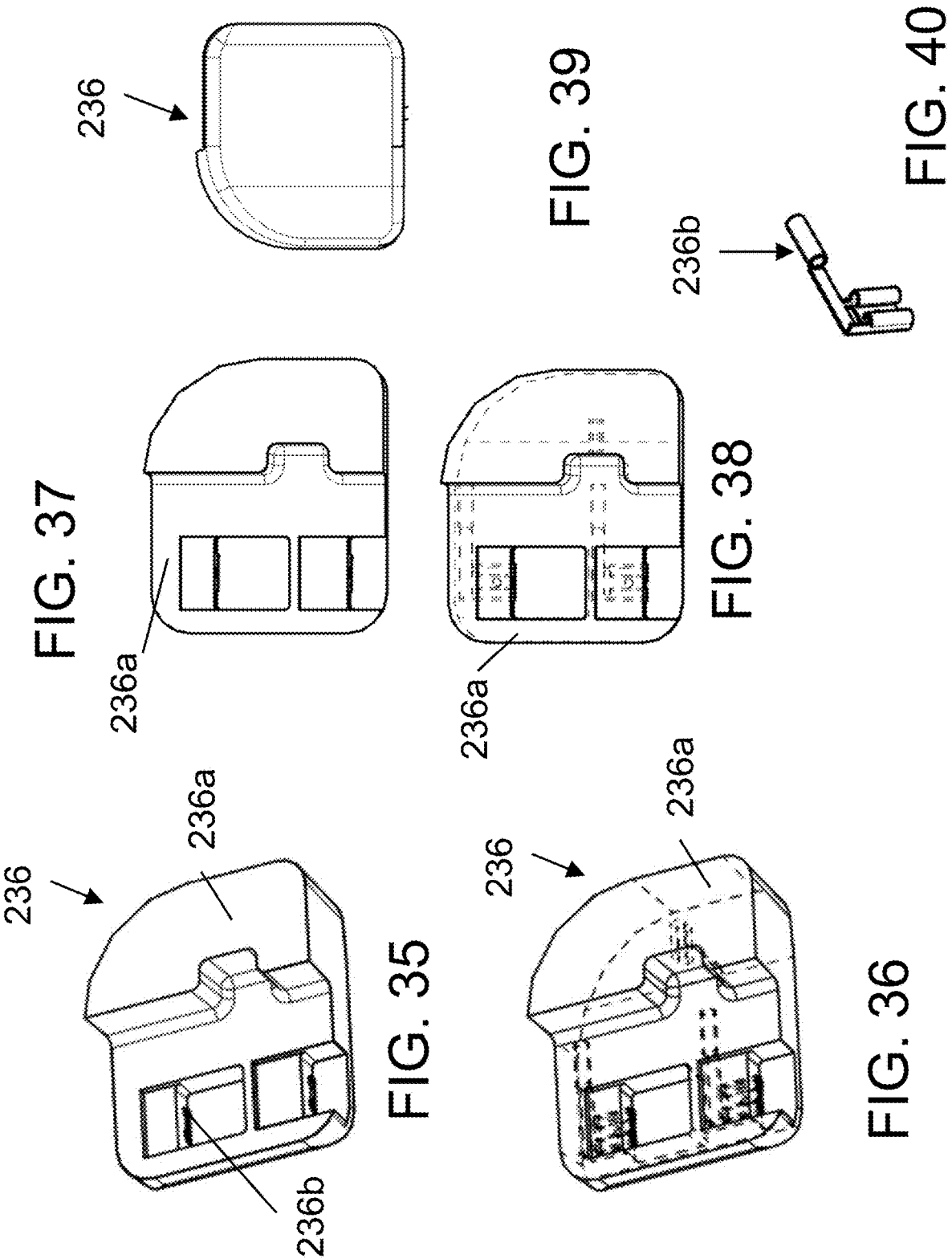
FIGS. 35 and 36 are perspective views of the movable panel connecting element of the flexible connector of FIG. 29.
FIGS. 37 and 38 are bottom views of the movable panel connecting element of the flexible connector.
FIG. 39 is a top view of the movable panel connecting element of the flexible connector.
FIG. 40 is a perspective view of one of the terminals of the movable panel connecting element of the flexible connector.

As shown in FIG. 30, the movable panel connector 232 comprises terminals 232*b* (a positive terminal and a negative terminal). The terminals 232*b* (see FIG. 42) may be soldered to the respective electrically conductive trace or busbar at the movable window panel 220 when the base portion of the respective terminal 232*b* is disposed at the movable window panel 220. When the movable panel connecting element 232 is affixed at the movable window panel 220, the terminals 232*b* are arranged at (and fixedly electrically conductively attached at) the movable window panel 220 so that the longitudinal axes and connecting direction of the terminals 232*b* are vertically oriented and parallel to one another for electrical connection with the movable panel connecting element 236 of the flexible connector 228. In the illustrated embodiment, the longitudinal axes of the respective terminals 232*b* are axially aligned or coaxial with one another.

As shown in FIGS. 35-40, the movable panel connecting element 236 comprises a plastic cover portion 236*a* that houses individual terminals 236*b* (a positive terminal and a negative terminal) (and that may be overmolded at the terminals 236*b*). The terminals 236*b* (e.g., female "flag" terminals) are received in slots of the cover portion 236*a* and the wires of the flexible connector 228 are routed through the cover portion 236*a* to the terminals 236*b*. The cover portion 236*a* includes openings at the terminals 236*b* to receive the ends of the terminals 232*b* (e.g., "gooseneck" terminals) at the movable panel 220 so that the terminals 232*b* can slide into the terminals 236*b* of the cover portion 236*a*. The terminals 236*b* are configured to, together and in tandem, electrically connect to the terminals 232*b* of the movable panel connector 232 via a single connecting movement of the movable panel connecting element 236 along the movable panel connector 232. Thus, the terminals 236*b* of the movable panel connecting element 236 are positioned at the cover portion 236*a* to have respective longitudinal axes that are parallel to one another and axially aligned or coaxial with one another to correspond to the respective terminals 232*b* of the movable panel connector 232. The cover portion 236*a* and the movable panel connector 232 at the movable panel 220 may include a guide feature and/or a detachable snap feature, such as in a similar manner as described above.

Similarly, the fixed panel connector 230 (FIGS. 43-46) comprises individual terminals 230*b* (a positive terminal and a negative terminal) arranged at (and fixedly electrically conductively attached at) the fixed window panel 216 (and electrically conductively connected to respective electrically conductive traces or busbars at the fixed window panel 216) so that the longitudinal axes and connecting direction of the terminals 230*b* are parallel and aligned or coaxial to one another, such as in a similar manner as discussed above with respect to the fixed panel connecting element 134 and the fixed panel connector 130. As shown in FIGS. 43 and 44, the fixed panel connecting element 234 comprises a plastic cover portion 234*a* that houses individual terminals 234*b* (a positive terminal and a negative terminal) (and may be overmolded at the terminals 234*b*). The terminals 234*b* are received in or disposed in slots of the cover portion 234*a* and the wires of the flexible connector 228 are routed through the cover portion 234*a* to the terminals 234*b*. The terminals 234*b* are configured to, together and in tandem, electrically connect to the terminals 230*b* (e.g., soldered "Z" terminals) at the fixed panel connector 230 via a single connecting movement of the fixed panel connecting element 234 along the fixed panel connector 230. Thus, the terminals 234*b* of the fixed panel connecting element 234 are positioned at the cover portion 234a to have respective longitudinal axes that are parallel to one another and axially aligned or coaxial with one another to correspond to the respective terminals 230b of the fixed panel connector 230.

Thus, and as shown in FIGS. 45 and 46, the fixed panel connecting element 234 is attached at the fixed panel connector 230 by sliding the fixed panel connecting element 234 relative to the fixed panel connector 230 in a horizontal direction (in the illustrated embodiment, the longitudinal axes of the terminals 230b are generally horizontal, but could be vertical or other direction or orientation). The sliding movement may be controlled and aligned via alignment features, such that sliding of the fixed panel connecting element 234 along the fixed panel connector 230 electrically connects the terminals 234b to the terminals 230b of the fixed panel connector. The terminal 230b electrically connects to the terminal 234b when a tab of the terminal 230b is inserted into a receiving portion of the terminal 234b as the sliding movement attaches the fixed panel connecting element 234 to the fixed panel connector 230.

Therefore, the window assembly provides for quick connection of the flexible connector to terminals at the fixed window panel and at the movable window panel via a single connecting movement or process at each panel. The movable panel connecting element of the flexible connector can slide horizontally or vertically onto the terminals at the movable window panel to make the connection to the two movable panel terminals at the same time. Similarly, the fixed panel connecting element of the flexible connector can slide horizontally or vertically onto the terminals at the fixed window panel to make the connection to the two fixed panel terminals at the same time.

Optionally, the window assembly may have a combination of the two designs. The tab design may significantly lower cost per terminal, improve soldering capability. The window assembly may reduce soldering to only six tab-based terminals for assembly. Optionally, the OEM connectors may be included with the fixed glass terminals to reduce additional two terminals. Optionally, a "ribbon" style cable may be soldered at a three-piece window assembly (two fixed panels at opposite sides of an opening) to reduce the number of terminals for those style window assemblies.

The heater grid of the movable window panel is powered in a manner that allows for heating or defogging or defrosting of the movable window panel irrespective of whether the movable window panel is opened or partially opened or closed. For example, the electrical connection between the vehicle power source or fixed panel heater grid and the movable panel heater grid may comprise a flexible connector or wire or cable, while the fixed panel heater grid may be electrically connected to the other fixed panel heater grid via a jumper wire or cable, such as by utilizing aspects of the rear slider window assemblies described in U.S. Pat. Nos. 9,579,955; 8,881,458 and/or 8,402,695, and/or U.S. patent application Ser. No. 17/654,409, filed Mar. 11, 2022, which are all hereby incorporated herein by reference in their entireties.

The window assembly includes two fixed window panels that are spaced apart so as to define an opening therebetween. The slider or movable window panel is movable along the lower rail and the upper rail of the frame portion to open and close the opening. Optionally, the slider window panel may be disposed at a lower carrier that receives the lower perimeter edge region of the slider window panel therein and that is slidably or movably received in the lower rail of frame portion. The two fixed window panels may comprise two separate panels with upper and lower appliques disposed above and below the aperture, or the two fixed window panels may be part of a single hole-in-glass window panel with the aperture formed therethrough.

The movable or slider window panel may be movable such as via manual pushing or pulling at the window panel or in response to actuation of a drive motor of a drive motor assembly or system, which may move cables or the like to impart horizontal movement of the slider window panel along the rails. Optionally, the drive motor assembly may utilize aspects of the drive assemblies of the types described in U.S. Pat. Nos. 4,920,698; 4,995,195; 5,146,712; 5,531,046; 5,572,376; 6,119,401; 6,955,009; 7,073,293 and/or 10,501,977, and/or U.S. Publication Nos. US-2019-0383084; US-2008-0127563 and/or US-2004-0020131, which are all hereby incorporated herein by reference in their entireties.

Optionally, the window assembly or assemblies may utilize aspects of the window assemblies described in U.S. Pat. Nos. 8,402,695; 8,322,073; 7,838,115; 7,332,225; 7,073,293; 7,003,916; 6,846,039; 6,691,464; 6,319,344; 6,068,719 and 5,853,895, and/or U.S. Publication Nos. US-2013-0174488; US-2011-0056140; US-2006-0107600; US-2008-0127563; US-2004-0020131 and/or US-2003-0213179, which are hereby incorporated herein by reference in their entireties. Although shown and described as a horizontally movable center window that moves relative to a pair of opposite side windows (such as for applications at the rear of a cab of a pickup truck or the like), it is envisioned that the electrical connections described herein are applicable to other types of movable window assemblies, such as horizontally movable window panels that move relative to a single fixed window panel and/or frames (such as for a rear or side opening of a vehicle or the like), and/or such as vertically movable window panels that move relative to one or more fixed panels and/or frames (such as for a rear or side opening of a vehicle or the like).

Although shown and described as a rear slider window assembly, such as for a pickup truck, aspects of the rear slider window assembly are suitable for use on other vehicular window assemblies, such as rear window assemblies of vehicles that are fixed window panels (having mounting structure that is configured to mount or attach or bond at an opening at a rear of a vehicle) or that are openable window panels (such as hinged liftgates or the like). For example, the window assembly may comprise a fixed rear window or backlite for a pickup truck or sedan or SUV or the like, or may comprise a movable side window or a fixed side window or a quarter window or the like, with the electrical connectors providing electrical connection to electrically conductive elements at the window panel (such as electrically conductive traces for heater grids or electrically conductive traces for electrically powering other elements at the window panel(s), such as lights or cameras or the like), without use of solder.

Changes and modifications to the specifically described embodiments may be carried out without departing from the principles of the present invention, which is intended to be limited only by the scope of the appended claims, as interpreted according to the principles of patent law.

The invention claimed is:

1. A vehicular rear slider window assembly, the vehicular rear slider window assembly comprising:

a fixed window panel, a movable window panel, and a frame portion fixed relative to the fixed window panel, wherein the frame portion comprises an upper rail and a lower rail;

wherein the fixed window panel comprises an opening, and wherein the movable window panel is movable along the upper rail and the lower rail between (i) a closed position, where the movable window panel is disposed at the opening, and (ii) an opened position, where the movable window panel is disposed at least partially along the fixed window panel;

electrically conductive traces established at a surface of the fixed window panel;

electrically conductive traces established at a surface of the movable window panel;

a fixed panel electrical connector affixed at and electrically connected to the electrically conductive traces at the surface of the fixed window panel;

a movable panel electrical connector affixed at and electrically connected to the electrically conductive traces at the surface of the movable window panel, wherein the movable panel electrical connector comprises first and second terminals electrically connected at respective portions of the electrically conductive traces, and wherein respective longitudinal axes of the first and second terminals of the movable panel electrical connector are coaxial with one another;

a flexible electrical connector for electrically connecting the fixed panel electrical connector to the movable panel electrical connector;

wherein the flexible electrical connector comprises (i) a movable panel connecting element configured to electrically connect to the movable panel electrical connector, and (ii) a fixed panel connecting element configured to electrically connect to the fixed panel electrical connector;

wherein the movable panel connecting element comprises first and second terminals disposed at a cover portion, and wherein respective longitudinal axes of the first and second terminals of the movable panel connecting element are coaxial with one another;

wherein the first and second terminals of the movable panel connecting element electrically connect together and in tandem with the respective first and second terminals of the movable panel electrical connector via movement of the cover portion in a direction parallel to the longitudinal axes of the first and second terminals of the movable panel electrical connector; and wherein, with the first and second terminals of the movable panel connecting element electrically connected with the first and second terminals of the movable panel electrical connector, the respective longitudinal axes of the first and second terminals of the movable panel electrical connector and the respective longitudinal axes of the first and second terminals of the movable panel connecting element are all coaxial with one another.

2. The vehicular rear slider window assembly of claim 1, wherein the first and second terminals of the movable panel electrical connector are disposed at a base portion, and wherein the cover portion is configured to slidably attach to the base portion.

3. The vehicular rear slider window assembly of claim 2, wherein the base portion and the cover portion comprise an alignment feature that aligns the first and second terminals of the movable panel connecting element with the first and second terminals of the movable panel electrical connector as the cover portion slidably attaches to the base portion.

4. The vehicular rear slider window assembly of claim 2, wherein the base portion and the cover portion comprise a retaining feature that retains the first and second terminals of the movable panel connecting element electrically connected with the first and second terminals of the movable panel electrical connector when the cover portion is slidably attached to the base portion.

5. The vehicular rear slider window assembly of claim 1, wherein, with the vehicular rear slider window assembly installed in a vehicle, the longitudinal axes of the first and second terminals of the movable panel electrical connector are horizontally oriented.

6. The vehicular rear slider window assembly of claim 1, wherein, with the vehicular rear slider window assembly installed in a vehicle, the longitudinal axes of the first and second terminals of the movable panel electrical connector are vertically oriented.

7. The vehicular rear slider window assembly of claim 1, wherein, with the vehicular rear slider window assembly installed in a vehicle, the first and second terminals of the movable panel electrical connector are one selected from the group consisting of (i) vertically spaced from one another and (ii) horizontally spaced from one another.

8. The vehicular rear slider window assembly of claim 1, wherein the fixed panel electrical connector comprises third and fourth terminals affixed at and electrically connected to respective portions of the electrically conductive traces at the surface of the fixed window panel, and wherein respective longitudinal axes of the third and fourth terminals of the fixed panel electrical connector are parallel to one another, and wherein the fixed panel connecting element of the flexible electrical connector comprises third and fourth terminals disposed in a plastic housing of the fixed panel connecting element, and wherein respective longitudinal axes of the third and fourth terminals of the fixed panel connecting element are parallel to one another.

9. The vehicular rear slider window assembly of claim 8, wherein the third and fourth terminals of the fixed panel connecting element electrically connect together and in tandem with the respective third and fourth terminals of the fixed panel electrical connector via movement of the plastic housing in a direction parallel to the longitudinal axes of the third and fourth terminals of the fixed panel electrical connector.

10. The vehicular rear slider window assembly of claim 9, wherein, with the vehicular rear slider window assembly installed in a vehicle, the longitudinal axes of the third and fourth terminals of the fixed panel electrical connector are horizontally oriented.

11. The vehicular rear slider window assembly of claim 9, wherein, with the vehicular rear slider window assembly installed in a vehicle, the longitudinal axes of the third and fourth terminals of the fixed panel electrical connector are vertically oriented.

12. The vehicular rear slider window assembly of claim 8, wherein, with the vehicular rear slider window assembly installed in a vehicle, the parallel longitudinal axes of the third and fourth terminals of the fixed panel electrical connector are one selected from the group consisting of (i) vertically spaced from one another and (ii) horizontally spaced from one another.

13. The vehicular rear slider window assembly of claim 8, wherein the respective longitudinal axes of the third and fourth terminals of the fixed panel electrical connector are coaxial, and wherein the respective longitudinal axes of the third and fourth terminals of the fixed panel connecting element are coaxial.

14. A method for assembling a vehicular rear slider window assembly, the method comprising:

providing a fixed window panel, a movable window panel, and a frame portion fixed relative to the fixed window panel, wherein the frame portion comprises an upper rail and a lower rail, wherein the fixed window panel comprises an opening, and wherein the movable window panel is movable along the upper rail and the lower rail between (i) a closed position, where the movable window panel is disposed at the opening, and (ii) an opened position, where the movable window panel is disposed at least partially along the fixed window panel;

wherein electrically conductive traces are established at a surface of the fixed window panel, and wherein electrically conductive traces are established at a surface of the movable window panel;

wherein a fixed panel electrical connector is affixed at and electrically connected to the electrically conductive traces at the surface of the fixed window panel;

wherein a movable panel electrical connector is affixed at and electrically connected to the electrically conductive traces at the surface of the movable window panel, and wherein the movable panel electrical connector comprises first and second terminals electrically connected at respective portions of the electrically conductive traces, and wherein respective longitudinal axes of the first and second terminals of the movable panel electrical connector are coaxial with one another;

providing a flexible electrical connector comprising (i) a movable panel connecting element, and (ii) a fixed panel connecting element;

wherein the movable panel connecting element comprises first and second terminals disposed at a cover portion, and wherein respective longitudinal axes of the first and second terminals of the movable panel connecting element are coaxial with one another;

positioning the cover portion at the movable panel electrical connector such that the first and second terminals of the movable panel connecting element are axially aligned with the first and second terminals of the movable panel electrical connector, respectively;

moving the cover portion in a direction parallel to the longitudinal axes of the first and second terminals of the movable panel electrical connector to move the first and second terminals of the movable panel connecting element together and in tandem relative to the respective first and second terminals of the movable panel electrical connector to electrically connect the first and second terminals of the movable panel connecting element to the respective first and second terminals of the movable panel electrical connector;

wherein, with the first and second terminals of the movable panel connecting element electrically connected with the first and second terminals of the movable panel electrical connector, the respective longitudinal axes of the first and second terminals of the movable panel electrical connector and the respective longitudinal axes of the first and second terminals of the movable panel connecting element are all coaxial with one another; and electrically connecting the fixed panel connecting element to the fixed panel electrical connector.

15. The method of claim 14, wherein the first and second terminals of the movable panel electrical connector are disposed at a base portion, and wherein moving the cover portion in the direction parallel to the longitudinal axes of the first and second terminals of the movable panel electrical connector comprises sliding the cover portion at least partially along the base portion to attach the cover portion at the base portion.

16. The method of claim 15, wherein the base portion and the cover portion comprise an alignment feature that aligns the first and second terminals of the movable panel connecting element with the first and second terminals of the movable panel electrical connector as the cover portion slides at least partially along the base portion.

17. The method of claim 15, further comprising retaining the first and second terminals of the movable panel connecting element in electrical connection with the first and second terminals of the movable panel electrical connector when the cover portion is attached to the base portion.

18. The method of claim 14, wherein, with the vehicular rear slider window assembly installed in a vehicle, the longitudinal axes of the first and second terminals of the movable panel electrical connector are horizontally oriented.

19. The method of claim 14, wherein, with the vehicular rear slider window assembly installed in a vehicle, the longitudinal axes of the first and second terminals of the movable panel electrical connector are vertically oriented.

20. The method of claim 14, wherein, with the vehicular rear slider window assembly installed in a vehicle, first and second terminals of the movable panel electrical connector are one selected from the group consisting of (i) vertically spaced from one another and (ii) horizontally spaced from one another.

21. The method of claim 14, wherein the fixed panel electrical connector comprises third and fourth terminals affixed at and electrically connected to respective portions of the electrically conductive traces at the surface of the fixed window panel, and wherein respective longitudinal axes of the third and fourth terminals of the fixed panel electrical connector are parallel to one another, and wherein the fixed panel connecting element of the flexible electrical connector comprises third and fourth terminals disposed in a plastic housing of the fixed panel connecting element, and wherein respective longitudinal axes of the third and fourth terminals of the fixed panel connecting element are parallel to one another.

22. The method of claim 21, wherein electrically connecting the fixed panel connecting element to the fixed panel electrical connector comprises (i) positioning the plastic housing at the fixed panel electrical connector such that the third and fourth terminals of the fixed panel connecting element are axially aligned, respectively, with the third and fourth terminals of the fixed panel electrical connector, and (ii) moving the plastic housing in a direction parallel to the longitudinal axes of the third and fourth terminals of the fixed panel electrical connector to move the third and fourth terminals of the fixed panel connecting element together and in tandem relative to the respective third and fourth terminals of the fixed panel electrical connector to electrically connect the third and fourth terminals of the fixed panel connecting element to the respective third and fourth terminals of the fixed panel electrical connector.

23. The method of claim 22, wherein, with the vehicular rear slider window assembly installed in a vehicle, the longitudinal axes of the third and fourth terminals of the fixed panel electrical connector are horizontally oriented.

24. The method of claim 22, wherein, with the vehicular rear slider window assembly installed in a vehicle, the longitudinal axes of the third and fourth terminals of the fixed panel electrical connector are vertically oriented.

25. The method of claim 21, wherein, with the vehicular rear slider window assembly installed in a vehicle, the parallel longitudinal axes of the third and fourth terminals of the fixed panel electrical connector are one selected from the group consisting of (i) vertically spaced from one another and (ii) horizontally spaced from one another.

26. The method of claim 21, wherein the respective longitudinal axes of the third and fourth terminals of the fixed panel electrical connector are coaxial, and wherein the respective longitudinal axes of the third and fourth terminals of the fixed panel connecting element are coaxial.

\* \* \* \* \*